United States Patent Office
3,504,512
Patented Apr. 7, 1970

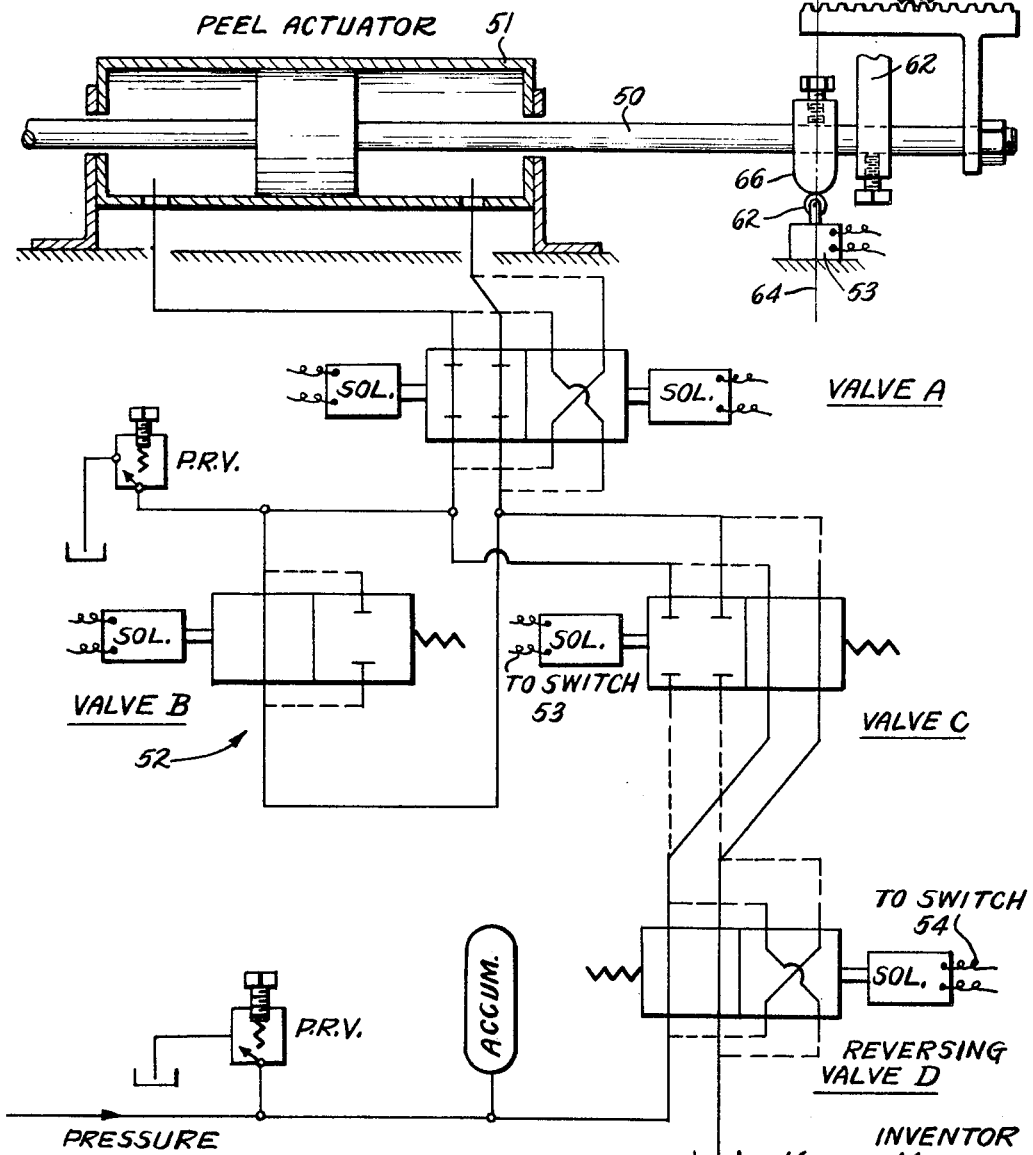

3,504,512
APPARATUS FOR CONTROLLING A MANIPULATOR IN ASSOCIATION WITH A FORGING PRESS
Keith Knowles, Sheffield, England, assignor to The British Iron and Steel Research Corporation
Filed Feb. 12, 1965, Ser. No. 432,185
Int. Cl. B21j 7/46
U.S. Cl. 72—22                                   7 Claims

ABSTRACT OF THE DISCLOSURE

Apparatus for controlling the carriage of a double-motion manipulator in association with a forging press, which apparatus comprises means for generating a first electrical signal representing a nominal carriage speed determined relative to a required bite distance and assumed press cycle time, and electrohydraulic system for initially controlling the carriage speed in response to said first signal, means for establishing a second electrical signal representing the difference between the actual and said assumed press cycle times, and means for correcting the operation of said system in response to said second signal.

---

This invention relates to forging and more particularly to control arrangements effective between forging presses and workpiece manipulators associated therewith.

In co-pending patent application No. 270,705, now U.S. Patent No. 3,274,819 there has been described what is referred to as a double-motion manipulator. In that instance such a manipulator has a longitudinally drivable carriage or support frame on which is mounted a workpiece gripping mechanism or peel which is, in turn, adjustable relative to its carrage in the longitudinal direction. In operation of such a manipulator the carriage may be driven at a substantially constant speed during a forging pass while the peel as allowed to float during press squeezes, whereby the peel remains stationary in space apart from slight movement due to workpiece elongation, and effectively moves backwardly relative to the carriage during carriage advance. During the ingot free time when the workpiece is not held by the press tools, the peel is driven longitudinally for return to a specified datum position relative to the carriage at which position the peel once again floats.

Other forms of double-motion manipulators make use of longitudinally sprung peels whereby what can be regarded as a recoil action occurs during ingot free time for return of the peel to a datum position.

It will be appreciated that the result of such operation is for the bite, that is the longitudinal advance of a workpiece between two successive squeezes thereof by the press tools, to be determined by the manipulator carriage speed and the press cycle time since at the commencement of a squeeze during one press cycle the peel is located at its datum position and is returned to this position for commencement of the squeeze of the next succeeding press cycle. In the case of substantially constant carriage speed the bite is therefore effectively determined by the press cycle time.

Theoretically than a desired bite for a forging press can be made compatible with a desired press cycle time as regards length and speed of press stroke by driving the carriage at a speed which is compatible with the desired quantities. However, this assumes that the squeeze time during the press cycle can be predetermined with similar accuracy to the ingot free time. While this assumption may be valid in some circumstances it cannot be considered necessarily true since the squeeze time can vary significantly with the required depth of press tool penetration into the workpiece during squeezing and the physical nature of the workpiece itself as regards hardness and temperature.

Accordingly, the present invention provides in one aspect a method of operating a double-motion manipulator in association with a forging press, which method comprises controlling the speed of the manipulator carriage in response to the actual forging press cycle time.

In another aspect the present invention provides control apparatus for carrying out such control method.

In order that the present invention may be clearly understood, the same will now be more fully described, by way of example, with reference to the accompanying drawings, in which.

While in its broadest aspects the invention contemplates direct control of a double-motion manipulator carriage drive in response to actual press cycle time, it is unlikely that such control would be applicable to conventional manipulator drive systems by reason of the inertia required. Accordingly, the example to be described takes account of preselecting a nominal carriage speed which is compatible with the desired bite as far as can be reasonably estimated in advance by reference to an assumed press cycle time and this is adequate to initiate manipulator movement. Thereafter, the nominal carriage speed is effectively corrected in response to comparison between the assumed and actual press cycle times.

Figure 1:
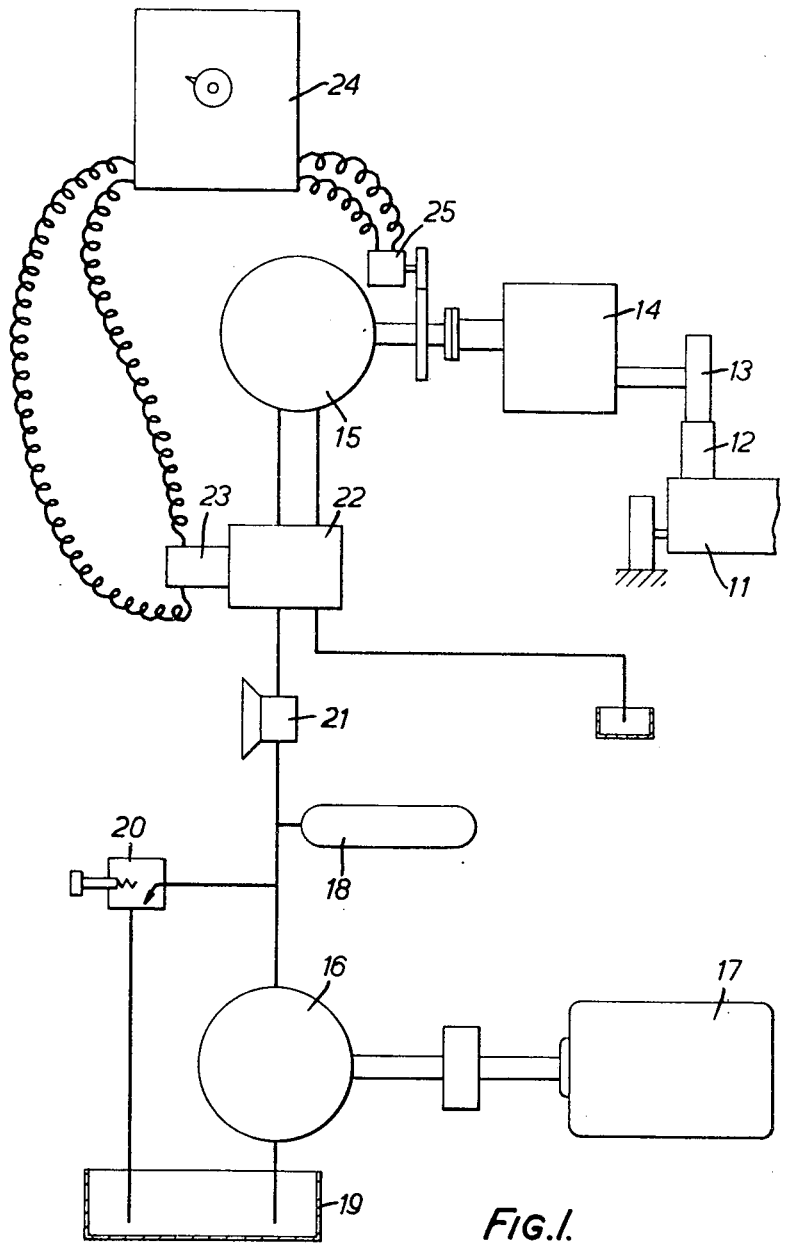
FIGURE 1 illustrates one embodiment of a control arrangement according to the present invention.

Considering FIGURE 1 then, this indicates the manipulator carriage 11 which carries a rack 12 driven by a pinion 13, which latter is itself driven through a reduction gear box 14 by a fixed displacement hydraulic motor 15. Motor 15 is powered by a hydraulic supply including a fixed displacement pump 16 driven by a three-phase A.C. induction motor 17 to charge an accumulator 18 from a reservoir 19. Excess output from the motor is returned to the reservoir via a pressure switch controlled line 20.

The output of pump 16, as regulated by the accumulator and pressure switch, passes through a microfilter 21 and is controlled by an electro-hydraulic servo valve 22 for application to motor 15.

Operation of servo valve 22 is controlled by a torque motor 23 initially responsive to the setting of control unit 24 to a given nominal carriage speed. However, during operation, the control unit is additionally subject to an indication of actual carriage speed as derived from tacho-generator 25 which accordingly completes a servo-system to ensure that the demanded carriage speed is actually attained.

As noted above in the introduction, the control arrangement of FIGURE 1 so far described can be subject to error as a result of error in the given nominal carriage speed and such errors can be corrected in accordance with the invention by adding to the tacho-generator signal a signal representing the difference between assumed and actual press cycle times. It will be noted that such injection of the additional control takes advantage of the existing servo-system control in that the nominal carriage speed setting as such is not varied, but rather the effect of such setting is corrected both in respect of any discrepancy in actual carriage speed and any discrepancy between assumed and actual press cycle times.

Figure 2:
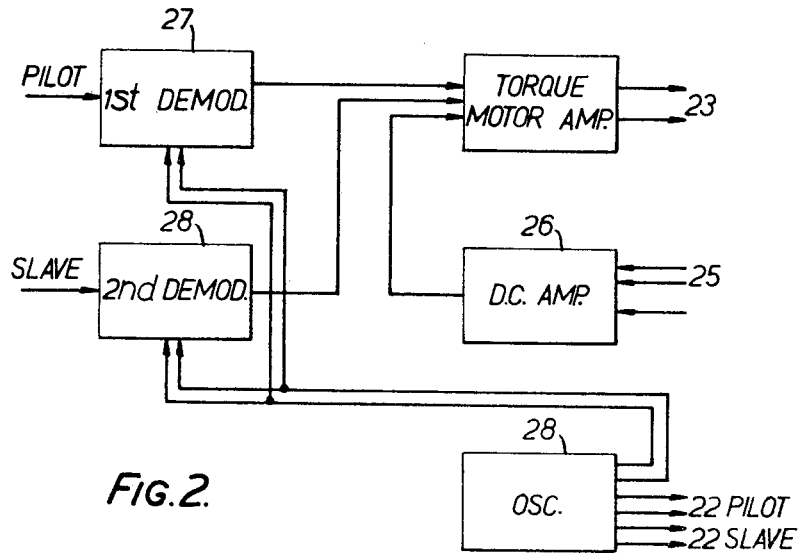
FIGURE 2 illustrates in more detail one form of part of FIGURE 1.

Considering further details of such a control arrangement in practice reference is made to FIGURE 2 which illustrates further detail of a suitable form of control unit for association with a Keelavite electro-hydraulic servo valve. Such a valve comprises two stages respectively including a pilot piston and slave piston. In operation the pilot piston moves in accordance with the desired speed indication signal, movement of the pilot valve generates sympathetic movement of the slave piston, and the latter controls the flow rate of oil through the valve.

In FIGURE 2, 26 indicates a D.C. amplifier the operating level of which is adjusted in accordance with desired nominal carriage speed by setting a potentiometer in the amplifier. The output signal from the D.C. amplifier is applied to a torque motor amplifier for motor 23 and thereby initially controls the same in accordance with the set nominal speed. The pilot piston of valve 22 is accordingly moved to represent the nominal speed and so also is the slave piston by the pilot.

The pilot piston having moved to the selected position, a signal is fed back representing its actual position and compared in a first demodulator 27 with a reference signal from oscillator 28. Similarly a signal representing the actual position of the slave piston is fed back to a second oscillator 29 for comparison with the oscillator reference signal. The net effect of these comparisons is comparison between the actual positions of the pistons, this net comparison being effected in the torque motor amplifier by application of the demodulator outputs thereto, with the result that the slave piston is moved to annul difference which occurs in the net comparison after initiation.

Additionally, the tacho-generator 25 output is applied as a further input to the torque motor output where the net comparison occurs and the result is to correct for differences between actual and desired nominal carriage speed. This correction first involves movement of the pilot piston and then sympathetic movement of the slave piston. The carriage speed is thus altered, the tacho-generator signal is altered, and if the system is still not in balance the correction cycle is repeated until balance is achieved. Thus the carriage achieves the desired nominal speed by a series of successive closer approximation control steps.

This same correction cycle is employed to take account of press cycle time variations and a further input signal to the D.C. amplifier is shown for this purpose to represent such variations.

Figure 3:
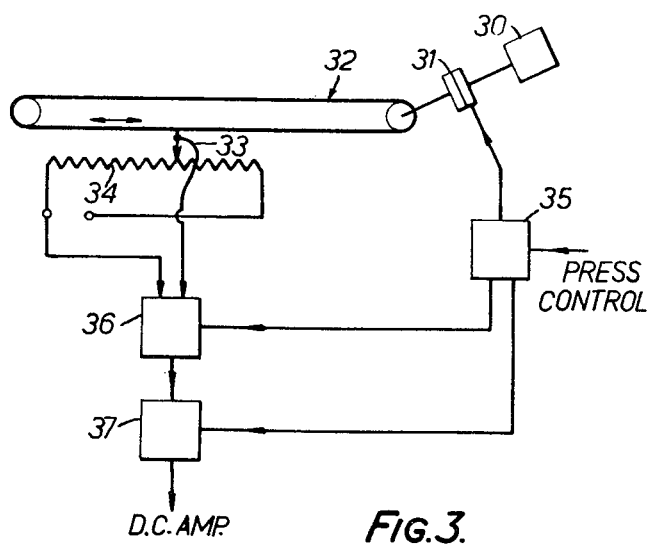
FIGURE 3 illustrates further detail associaed with FIGURE 2.

FIGURE 3 illustrates an arrangement for indicating press cycle time variations. In FIGURE 3 a constant speed motor 30 is continuously energised and an electromagnetic clutch 31 is energised during a press cycle whereby the motor drives a pulley-belt system 32 carrying a movable contact 33 of a potentiometer 34. For example, this drive may be energised during a period starting from the time that the press tools reach a predetermined separation, such as a fixed maximum, after squeezing until the time that the squeeze terminates and tool separation commences. These times are readily indicated by signals derived from an automatic press control system and the period in question takes account of any variable factors of press cycle time since the relevant tool separation stroke and rate are known and usually constant. This energisation period is controlled then by a unit 35 responsive to press control and the contact 33 will provide an indication of actual press cycle time during each cycle, the known press cycle time portion not measured by the contact allowing the contact to be returned to zero by a spring or the like while the clutch 31 is disengaged.

At the time that the clutch is disengaged under the control of unit 35, so by the same control the signal from contact 33 is sampled, stored, and applied to the D.C. amplifier of FIGURE 2 for the duration of the next press cycle. For example, storage may be effected by charging a condenser to a level representing actual press cycle time and switching the same into the D.C. amplifier circuit during the subsequent press cycle for correction purposes, the capacitor being normally switched out and shorted to ensure complete discharge immediately before resetting for the next cycle. In any event sampling and storage units are indicated generally at 36 and 37 FIGURE 3.

The stored signal can, of course, be equally well injected into the tacho-generator circuit, as noted earlier, since functionally this achieves the same advantageous correction and use of an existing servo-system. Also, it will be necessary from a functional point of view to compare the actual press cycle time with assumed press cycle time, but this can be considered to be taken into account by the setting of desired nominal carriage speed in the D.C. amplifier. However, specific comparison will normally be required where both assumed press cycle time and required bite vary.

Regarding the drive control of a double-motion manipulator, an appropriate hydraulic control for this purpose has already been described in co-pending U.S. patent application No. 3,274,819 with particular reference to FIGURE 14 thereof. The function of such double-motion has been described above and it is sufficient to note that the earlier application just mentioned describes a suitable hydraulic valve arrangement including valves 33, 36 and 37 which correspond to valves A, B, C, respectively of FIGURE 4 of the present application, and comprise a system controlled to drive the peel and to allow the peel to float during ingot free time and squeeze time respectively. Said patent also provides a limit switch effective between the peel and carriage to indicate the datum position therebetween. A corresponding switch is shown at 53 in FIGURE 4 of the present application and comprises a contact 66 carried by the peel and a second contact 67 mounted on the carriage. However, in such arrangement the peel drive is not terminated until the datum position is reached and this may produce overshoot. It will be appreciated in this respect that one cannot employ a mechanical stop to avoid overshoot if forging is required during both manipulator advance and retreat.

Accordingly, it is proposed, as shown in FIGURE 4 of the present application, that the peel drive provided by double-acting peel actuator 51 and controlled by valves A to D of hydraulic circuit 52 comprise first an acceleration and then a deceleration to reduce the possibility of overshoot. A limit switch 54 is employed which is responsive to relative movement between the carriage and peel. This switch 54 is in addition to limit switch 53 responsive to movement of the peel per se. A first contact 55 of switch 54 is supported by an arm 62 on the peel and is in alignment with the contact of datum limit switch 53 on the peel 50 in a plane transverse to the manipulator axis, and the second contact 56 of switch 54 is initially aligned with but movable from the other datum limit switch contact 55 on the bearer bar 68 attached to the carriage. Said second contact 56 is arranged to be driven during squeeze time in the same direction as the peel movement "A" relative to the carriage, but through a 2:1 reduction gear train 60. The wheels of this gear train are mounted on axles fixed to the carriage and the arrangement is such as to freewheel during relative movement of the peel and carriage in the other direction and so that during squeeze time the additional limit switch has a first contact 55 which moves with the peel and a second contact 56 which moves along the carriage with the peel but only half the distance of the first contact. Then during ingot free time the peel is driven, in a conventional manner with acceleration, and with said second contact 56 at first remaining stationary on the carriage by virtue of the freewheel arrangement, but when the peel has been driven half way back to its datum position said first and second contacts 56, 56 engage to initiate decelerating peel drive which is maintained until termination at the datum position, as before. Such deceleration may be produced by an arrangement in which closing of the contact 55–56 operates reversing valve D to apply pressure to the side of the piston of actuator 51 toward which the peel is moving. Then when the limit switch 53 contacts the cam 66 on the peel, this switch closes valve C, blocking the peel actuator. The said second contact 56 will at the same time be returned to the datum position by and engagement with said first contact 55.

Considering now one full press cycle starting with the peel at its datum position and at the beginning of a squeeze time.

In this start position, the press provides a signal which operates the solenoids of valves B and C so that valve B connects together opposite sides of peel actuator 51 to permit the piston to float or move freely within the cylinder of the actuator, and so that valve C assumes a blocked condition. During squeeze time, the carriage and peel move relative to each other causing the first and second contact 55 and 56 to move in a direction A; due to the reduction ratio of gear 60, the contacts 55 and 56 will move apart while proceeding in direction A since the amount of relative movement between the peel (including contact 55) and the carriage is twice that between the contact 56 and the carriage. At the end of squeeze time, the press signal is cancelled allowing valves B and C to return to their biased conditions in which valve B is blocked and valve C applies pressure fluid to one side of the piston of actuator 51 to return the peel with acceleration in a direction opposite to direction A to its datum position. Up to this point, the opertation is the same as described in said U.S. patent No. 3,274,819, but when the peel has been driven approximately half way back to its datum position, the first and second contacts 55, 56 reengage to operate changeover valve D to apply pressure to the other side of the piston of actuator 51 thus effecting a decelerating peel drive which is maintained until termination at the peel datum position; at the peel datum position, the contact 66 engages contact 67 of switch 53 to actuate the solenoid of valve C to cause the valve to assume its blocked condition and hence stop the peel at its datum position; the second contact 56 will at the same time be returned to the datum position due to the engagement between itself and the first contact 55 during the second half of the return movement.

It will be seen that account is automatically taken of differing relative movement between the carriage and peel during squeeze time in establishing the halfway point at which acceleration changes to deceleration for the peel drive during ingot free time. Also it will be noted that by employing reversal of a common hydraulic supply as between the ends of a double-acting cylinder drive for the peel to effect change from acceleration to deceleration, the peel should attain substantially zero velocity on reaching the datum position.

Lastly, since account is to be taken of forging on advance and in retreat, there may be two second contacts for the additional limit switch with individual 2:1 drive/freewheel connections operable in mutually opposite senses along the manipulator axis.

What is claimed is:

1. Apparatus for controlling a double-motion manipulator in association with a forging press, which apparatus comprises means for generating a first electrical signal representing a nominal carriage speed determined relative to a required bite distance and assumed press cycle time, means for initially controlling the carriage speed in response to said first signal, means for establishing a second electrical signal representing the difference between the actual and said assumed press cycle times, and means for correcting the operation of said control means in response to said second signal.

2. Apparatus according to claim 1 wherein said control means comprises a servo system responsive to said first signal as command and means for generating a third electrical signal representing actual carriage speed which third signal is effective as feedback in said servo system, and wherein said correction means comprises means for applying said second signal to said servo system.

3. Apparatus according to claim 2 wherein said second signal is applied to augment said third signal.

4. Apparatus according to claim 1 wherein said second signal is repetitively established during only a part of the press cycle which part at least includes the squeeze time.

5. Apparatus according to claim 1 comprising peel drive means operable to return the peel to its datum position relative to the carriage during ingot free time first by accelerating drive and then by decelerating drive.

6. Apparatus according to claim 5 comprising a double-motion manipulator having a first limit switch including one contact actuated by the peel and one on the carriage which contacts engage with the peel in its datum position relative to the carriage; and a second limit switch having a first contact aligned on the peel with that of the first limit switch transverse to the manipulator axis, a second contact similarly aligned with the other first limit switch contact on the carriage when the peel is at its datum position, a reduction gear drive/freewheel connection between the peel and said second contact for moving the same longitudinally of the carriage in response to relative peel/carriage movement during the squeeze time, means for initially accelerating the peel to return towards its datum position during a first portion of ingot free time, means for decelerating the peel return in response to engagement of said first and second contacts, and means for disconnecting said peel drive means in response to engagement of said first limit switch contacts.

7. Apparatus according to claim 6 wherein said reduction gear drive operates in a 2:1 ratio and said peel drive means operates to effect substantially the same rate of change of peel speed but in reverse senses as between acceleration and deceleration, whereby the peel attains substantially zero speed on return to its datum positions.

References Cited

UNITED STATES PATENTS

| | | | |
|---|---|---|---|
| 2,327,849 | 8/1943 | Wolfe | 72—417 |
| 3,267,708 | 8/1966 | Sims | 72—421 |
| 3,274,819 | 9/1966 | Knowles | 72—421 |

CHARLES W. LANHAM, Primary Examiner

G. P. CROSBY, Assistant Examiner

U. S. Cl. X. R..

72—421